US009623747B2

(12) United States Patent
Darpino et al.

(10) Patent No.: US 9,623,747 B2
(45) Date of Patent: Apr. 18, 2017

(54) FLUID RESERVOIR CAP

(71) Applicant: RB Distribution, Inc., Colmar, PA (US)

(72) Inventors: Patrick Darpino, Colmar, PA (US); Brian Reyes, Colmar, PA (US)

(73) Assignee: RB DISTRIBUTION, INC., Colmar, PA (US)

( * ) Notice: Subject to any disclaimer, the term of this patent is extended or adjusted under 35 U.S.C. 154(b) by 0 days.

(21) Appl. No.: 14/883,228

(22) Filed: Oct. 14, 2015

(65) Prior Publication Data

US 2016/0101685 A1    Apr. 14, 2016

Related U.S. Application Data

(60) Provisional application No. 62/063,749, filed on Oct. 14, 2014.

(51) Int. Cl.
*B60K 15/05*   (2006.01)
*B60K 15/04*   (2006.01)

(52) U.S. Cl.
CPC .. *B60K 15/0406* (2013.01); *B60K 2015/0438* (2013.01); *B60K 2015/0451* (2013.01)

(58) Field of Classification Search
CPC ........ B60K 15/0406; B60K 2015/0438; B60K 2015/0451
USPC ........... 220/233–238, 304, DIG. 32, DIG. 33
See application file for complete search history.

(56) References Cited

U.S. PATENT DOCUMENTS

| 4,436,219 | A |   | 3/1984 | Reutter |
| 5,615,793 | A | * | 4/1997 | Muller ............... B60K 15/0409 220/203.06 |
| 5,638,975 | A |   | 6/1997 | Harris |
| 6,213,331 | B1 |  | 4/2001 | Morgan et al. |

* cited by examiner

Primary Examiner — James N Smalley
(74) Attorney, Agent, or Firm — Volpe and Koenig, P.C.

(57) ABSTRACT

A cap for closing a fill tube of a fluid container that includes fewer part and requires just a quarter turn between opened and closed positions. The cap has a lower plate for engagement with a free end of a fill tube and an upper plate that connects to a cover. The upper and lower plates have cooperating pawl and detent portions that form a ratchet member. Rotation of the cap by approximately a quarter turn moves the cap form an opened position to a closed position against the neck of a filler tube.

10 Claims, 3 Drawing Sheets

FLUID RESERVOIR CAP

CROSS REFERENCE TO RELATED APPLICATION

This application claims the benefit of U.S. 62/063,749 filed Oct. 14, 2014, which is incorporated by reference as if fully set forth.

FIELD OF INVENTION

The invention generally relates to a cap that acts as an egress/ingress barrier to a fluids system. More specifically, the invention relates to a Diesel Exhaust Fluids Cap ("DEF") that is required for certain vehicles that are diesel powered. The cap has an internal ratcheting sub-assembly that provides user-feedback of a fully-engaged and compressed seal at a quarter-turn.

BACKGROUND

Filler caps that provide egress/ingress barriers to prevent material waste or contamination and still provide access for re-filling are known. In many applications, it is desired that an end-user receives some indication of when the cap is fully engaged.

SUMMARY

The present invention provides all of these desirable features in a cap that only requires just a quarter-turn to be fully engaged with the fill neck, provides an audible or tactile feedback that it is engaged, and has a simplified construction with fewer part that known caps. In addition, the cap has reduced wear through the use of an unbiased seals that does not rotate with respect to filler tube mating surface.

The present cap achieves gasket engagement and compression by a cam-interface between a pair of extensions and the sloped or ramped contact surfaces defined in the fill neck of the reservoir. The internal components that provide the ratcheting mechanism also allow for a gasket seal-interface that does not rotate with respect to its mating surface. The ratcheting mechanism provides a clear stop and a user indication that the cap has fully engaged with the fill neck.

BRIEF DESCRIPTION OF THE DRAWING(S)

FIG. 1 is an exploded view of a cap according to the invention;

FIG. 2 illustrated a sub-assembly of the lower and upper plates prior to the cap being turned against a fill tube;

DETAILED DESCRIPTION OF THE PREFERRED EMBODIMENT(S)

Figure 1:
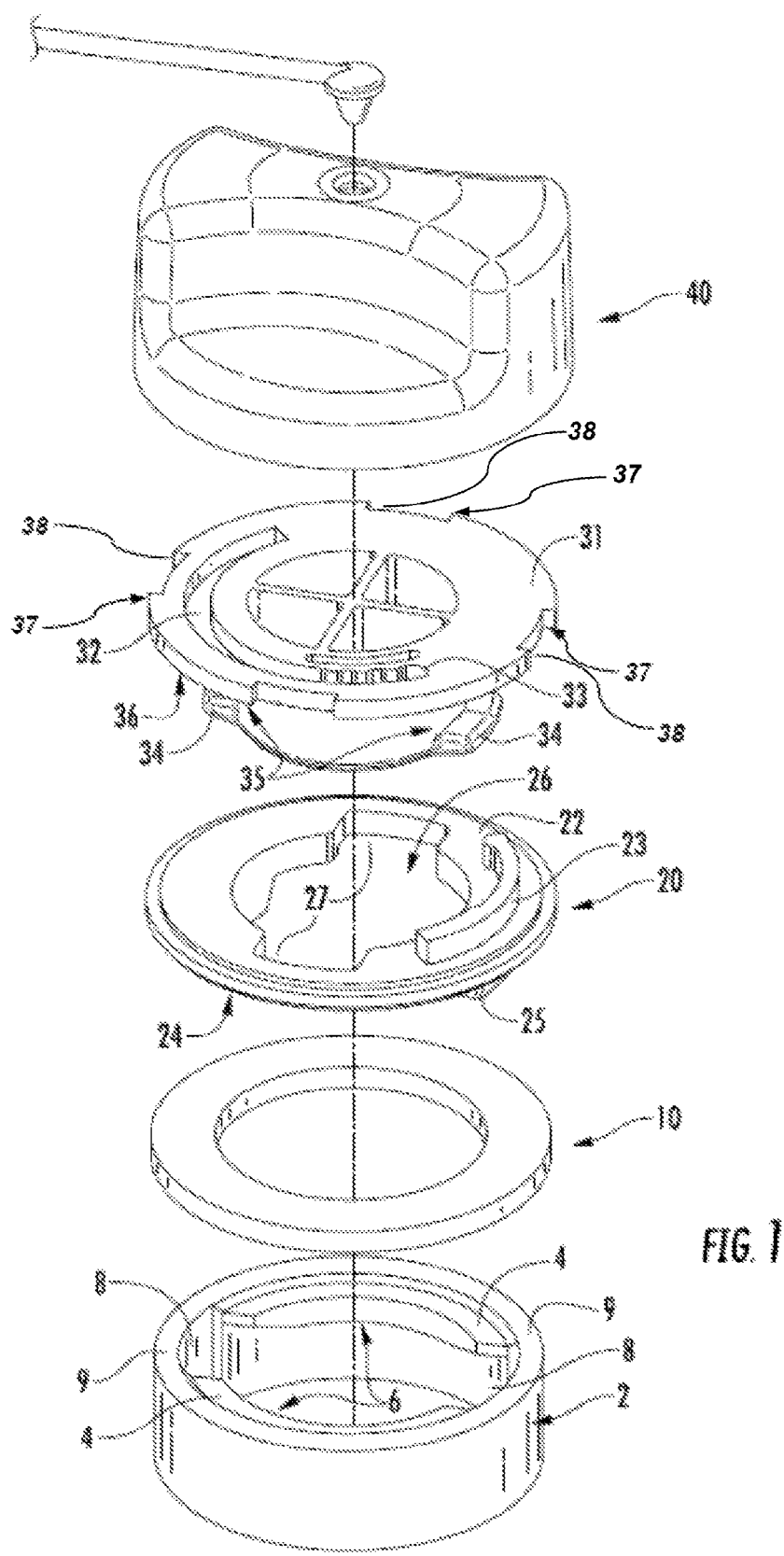

With reference to FIG. 1, there is illustrated an exploded cap and a fragmentary fill tube. The fill tube 2 typically has some form of upper obstructions 4 in the fill neck that define cam surfaces 6 and access slots 8 through which follower projections or wings 34 can pass to engage the cam surfaces for drawing the cap down against the upper edge 9 of the fill tube. Those of skill in the art will recognize that the structure of such a fill tube is well known and no further description is needed for an understanding of the invention.

The seal 10 is preferably a disc or ring of an elastomeric material that is compressible under the force of the cap's follower projections 34 engaging the cam surfaces 6. The presently preferred material for seal 10 is EPDM rubber (ethylene propylene diene monomer), which is inert to the type of fluid typically stored in the reservoir.

The lower plate 20 has an upper surface 22 on which there is formed a raised appendage or ratchet arm 23. Ratchet arm 23 has a length that is about one-quarter of the full circumferential distance of its location in upper plate 30. The lower plate 20 has a pair of tabs 25 that are spaced from its lower surface 24. The reliefs between the lower surface 24 and tabs 25 are dimensioned to receive the seal 10 on the underside of plate 20. The aperture 26 and opposed slots 27 in the central portion of lower plate 20 enable assembly with the upper plate 30.

The upper plate 30 has an upper surface 31 having a slot 32 and ratchet detents or slots 33. The slot 32 is approximately twice the length of the ratchet arm 23. This relative sizing permits the ratchet arm 23 to engage the slot 32 away from the ratchet detents 33 when the cap is at rest and to have the ratchet arm 23 and detents 33 engage when the cap is turned approximately a quarter turn.

The follower projections or wings 34 of upper plate 30 pass through the slots 27 in lower plate 20 when the ratchet arm 23 is positioned in the at rest location in slot 32. The lower surface 37 of upper plate 30, see FIG. 5, will rest on upper surface 22 of lower plate 20 so that the follower projections 34 are below the seal 10 and in position to engage cam surface 6 of the filler tube 2.

Figure 2:
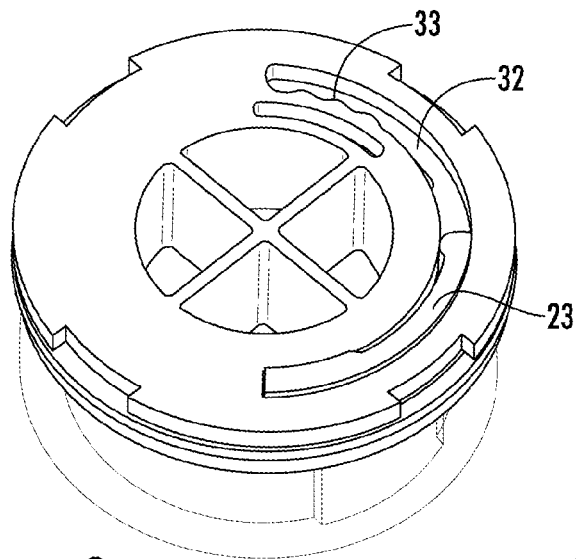
Figure 3:
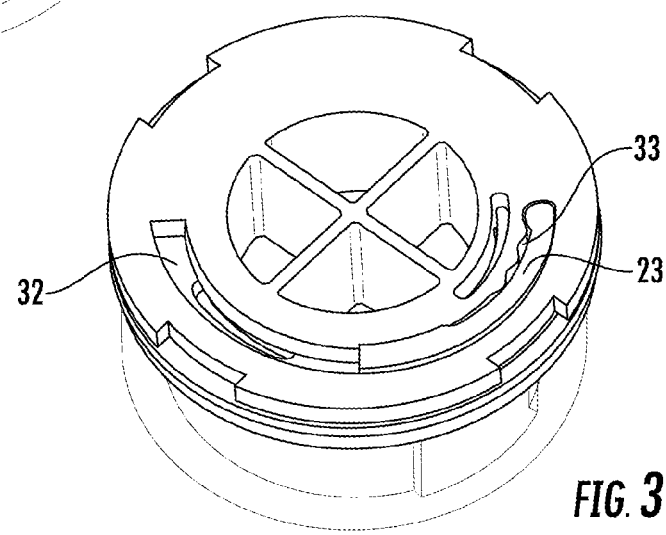
FIG. 3 illustrates the sub-assembly of FIG. 2 after it is turned.

FIGS. 2 and 3 illustrate the assembly of plates 20 and 30 in the rest position and with the ratchet arm 23 engaged with the ratchet detents 33.

Figure 4:
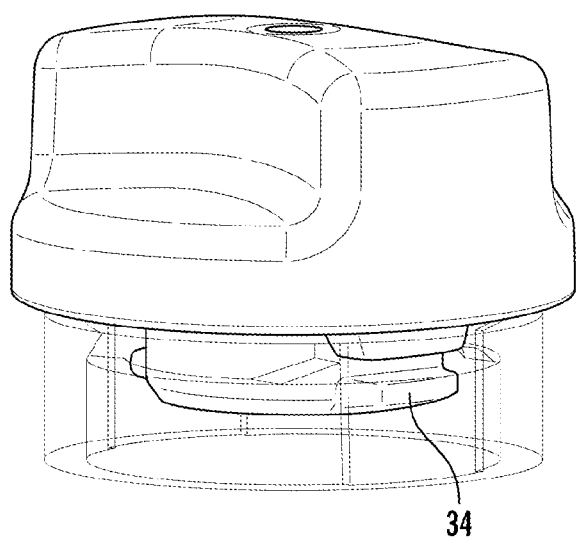
FIG. 4 illustrates an assembled view of the cap.
Figure 5:
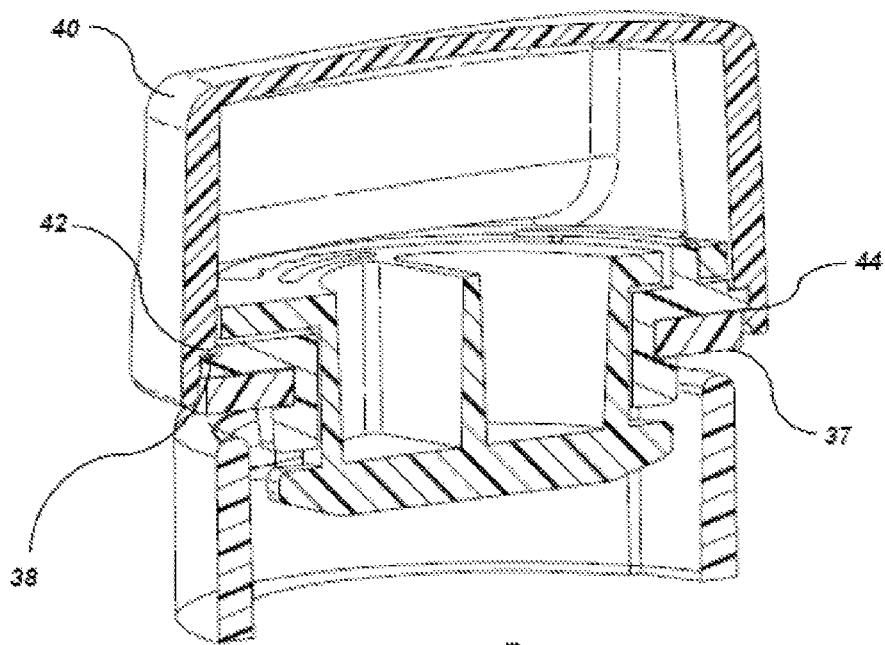
FIG. 5 illustrates the cap in a fill tube in an opened position prior to the cap being turned against the fill tube; and, FIG. 6 illustrates the cap when it is turned a quarter turn against the fill tube.
Figure 6:
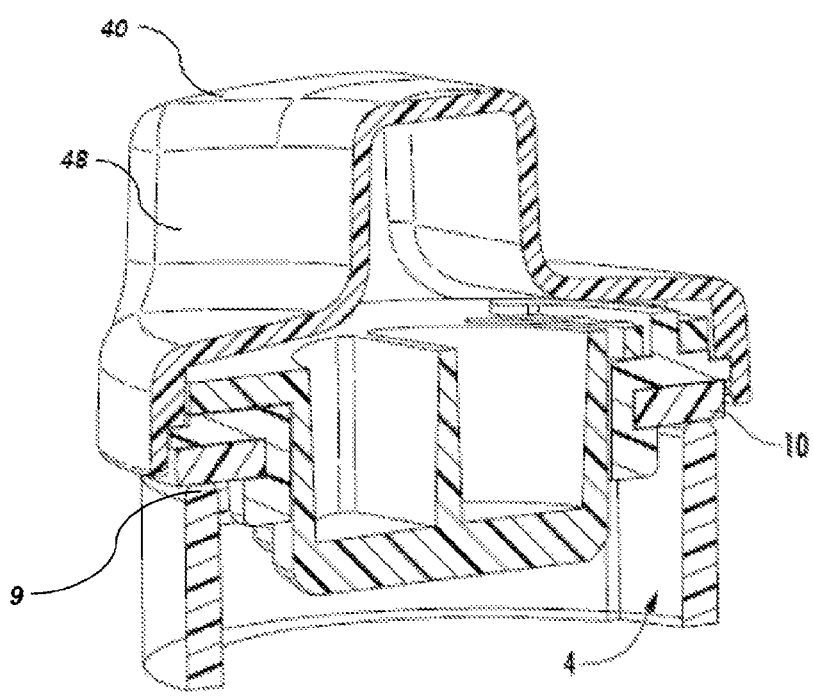

FIG. 4 illustrated a fully assembled cap with the projections or wings 34 in the dependent position to engage cam surfaces 6 in the fill tube. With reference to FIG. 5, it can be seen how cover 40 is connected to the upper plate 30. Upper plate 30 has a plurality of notches 38, see FIG. 1, that receive the portions 42 of cover 40. Cover 40 also has an internal groove 44 that receives the perimeter of upper plate 30 that extends beyond the notches 38. With reference to FIGS. 5 and 6, it can be seen that gripping the upstanding portion 48 of cover 40 and turning the cap a quarter turn draws the seal 10 against the upper edge 9 of the fill tube.

What is claimed is:

1. A cap for closing a fill tube of a fluid container, the cap comprising;
    a lower plate that is configured on one surface to retain a sealing member in a position for engagement with a free end of the fill tube and has a raised appendage on a surface opposite the sealing member;
    an upper plate that has an upper surface, with an interior slot adapted for receiving the raised appendage and a plurality of perimeter slots, and a dependent free end projections that extend below the sealing member and draw the sealing member into contact with a free end of the fill tube; and,
    a cover that engages the plurality of perimeter slots and encloses the upper plate.

2. The cap of claim 1, wherein the interior slot of the upper surface has a length that is twice that of the raised appendage.

3. The cap of claim 2, wherein the raised appendage is arcuate and includes a pawl, and the interior slot is arcuate with a plurality of recesses dimensioned to receive the pawl.

4. A cap for closing a fill tube of a fluid container, the cap comprising;
   a lower plate with a lower side that retains a sealing member in a position for engagement with a free end of the fill tube, an opposite upper side that includes an arcuate appendage of a first length, and a central aperture;
   an upper plate that has an upper surface with an arcuate slot that has a length that is at least twice the first length and receives the arcuate appendage and a lower surface with a depending free end that fits within the central aperture, extends below the sealing member, and includes projections that engage with a free end of the fill tube and draw the sealing member into contact with a free end of a fill tube; and,
   a cover that encloses the upper plate.

5. The cap of claim 4, wherein the arcuate appendage includes a pawl and the arcuate slot includes a plurality of recesses dimensioned to receive the pawl.

6. The cap of claim 5 wherein the interaction of the pawl with the plurality of recesses limits rotation of the cap.

7. A cap for closing a fluid container fill tube, the cap comprising;
   a first plate that has a lower surface with depending projections that are spaced at a predetermined distance from a lower surface tube, and a raised appendage on a surface opposite to the lower surface;
   a sealing member that abuts the lower surface and is retained by the depending projections in position for engagement with a free end of the fill tube;
   an upper plate that has an upper surface, with an interior slot adapted for receiving the raised appendage, and a dependent free end projections that extend below the sealing member and draw the sealing member into contact with the free end of the fill tube; and,
   a cover that engages and encloses the upper plate.

8. The cap of claim 7, wherein the upper surface interior slot has a length that is twice that of the raised appendage.

9. The cap of claim 8, wherein the raised appendage is arcuate and includes a pawl, and the upper surface interior slot is arcuate with a plurality of recesses dimensioned to receive the pawl.

10. A cap for closing a fill tube of a fluid container that is rotatable between opened and closed positions, the cap comprising;
    a cover that includes a defined gripping portion;
    a first plate that has a lower surface with depending projections that are spaced at a predetermined distance from the lower surface tube, and a raised appendage on a surface opposite to the lower surface;
    a sealing member that abuts the lower surface and is retained by the depending projections in position for engagement with a free end of the fill tube; and,
    an upper plate that has an upper surface, with an interior slot adapted for receiving the raised appendage, and a dependent free end projections that extend below the sealing member and draw the sealing member into contact with the free end of the fill tube;
    wherein the cover engages the upper plate and the defined gripping portion rotates the cap between opened and closed positions.

* * * * *